A. F. WARD.
DOUGH DIVIDING MACHINE.
APPLICATION FILED OCT. 25, 1911.

1,144,952.

Patented June 29, 1915.
4 SHEETS—SHEET 2.

Witnesses:
N. C. Lombard
Mary C. Smith

Inventor:
Ashley F. Ward,
by Walter E. Lombard,
Atty.

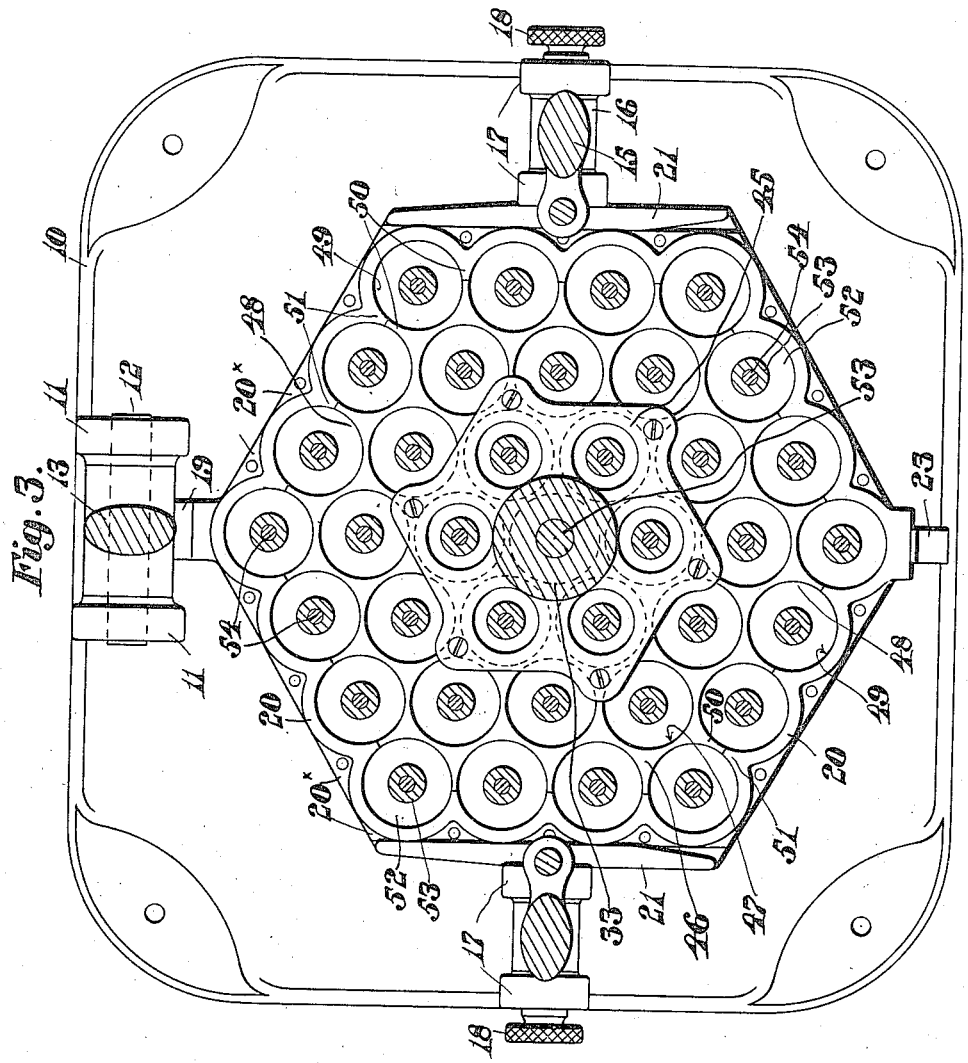

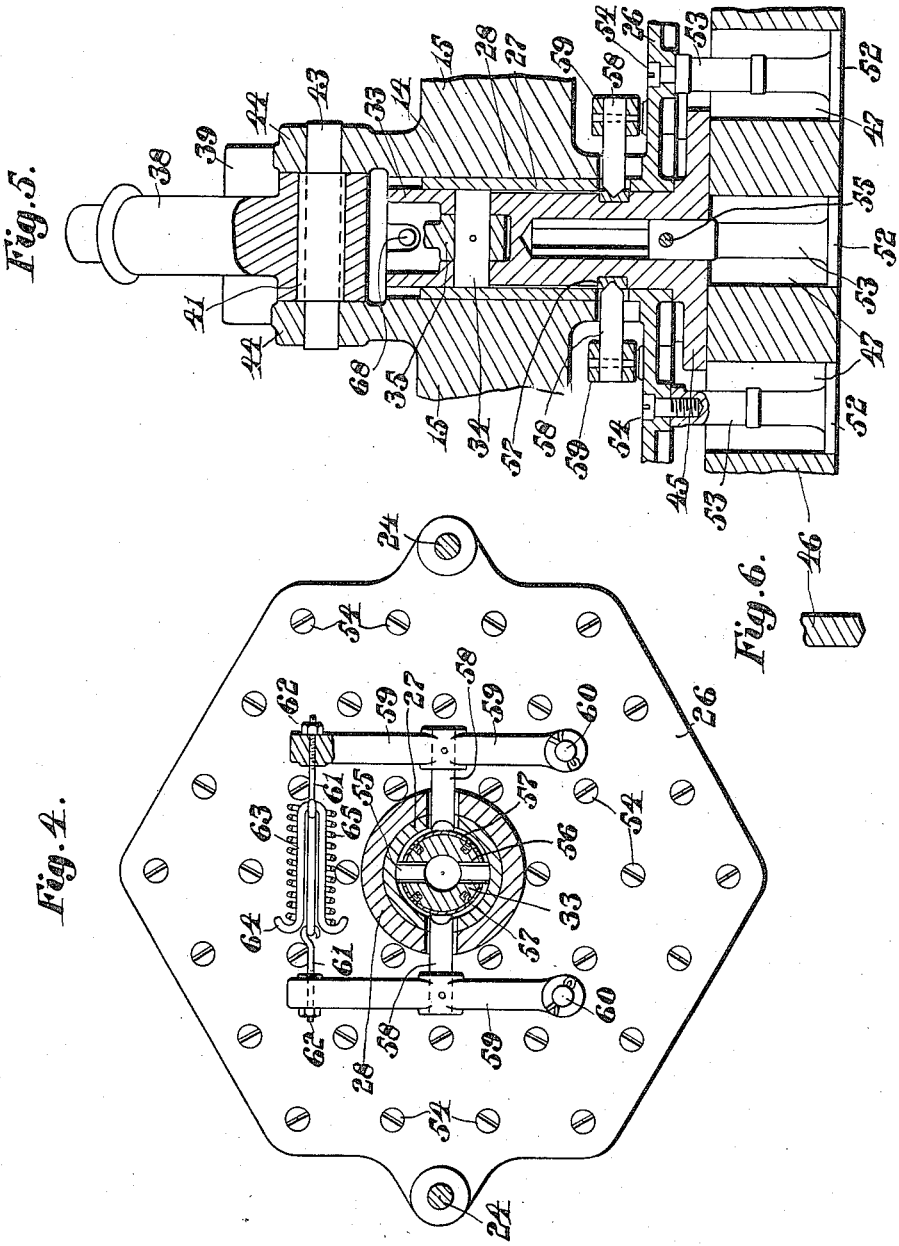

UNITED STATES PATENT OFFICE.

ASHLEY F. WARD, OF BOSTON, MASSACHUSETTS, ASSIGNOR TO THE A. F. WARD MACHINERY CO., A CORPORATION OF MASSACHUSETTS.

DOUGH-DIVIDING MACHINE.

1,144,952. Specification of Letters Patent. Patented June 29, 1915.

Application filed October 25, 1911. Serial No. 656,998.

*To all whom it may concern:*

Be it known that I, ASHLEY F. WARD, a citizen of the United States of America, and a resident of Boston, in the county of Suffolk and State of Massachusetts, have invented certain new and useful Improvements in Dough-Dividing Machines, of which the following is a specification.

This invention relates to machines for subdividing a mass of dough or similar material into fractional parts, and has for its main object the subdivision of the mass into parts of equal size and weight.

One of the objects of the invention is to divide the dough in such a manner that no portion of raw dough will be exposed, the upper and lower skins being united during the dividing operation so that each fractional part of the divided mass is completely enveloped thereby, thus dispensing with all hand work on the fractional parts prior to baking.

The invention further consists in certain novel features of construction and arrangement of parts which will be understood by reference to the description of the drawings and to the claims hereinafter given.

Figure 1:
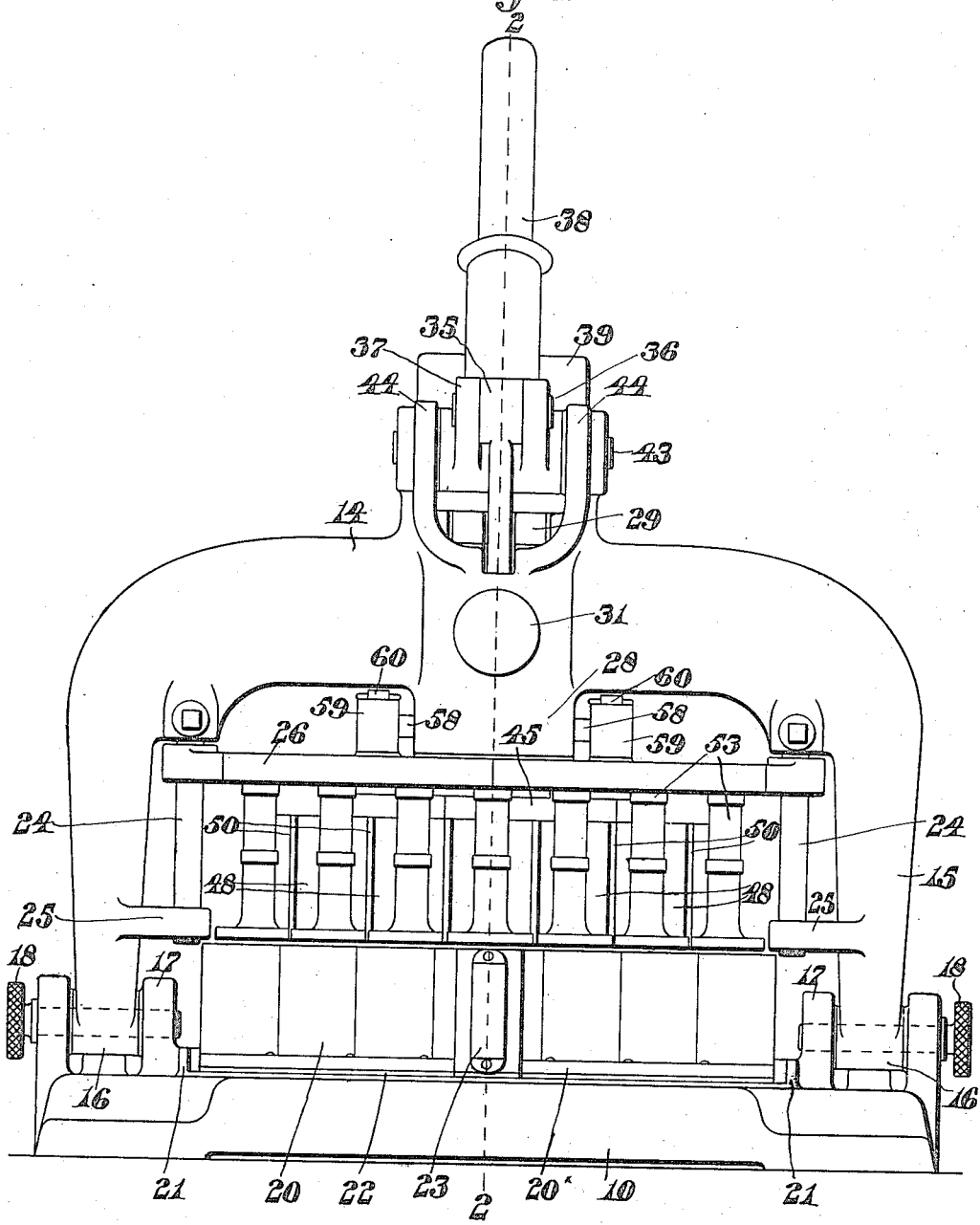
Figure 2:
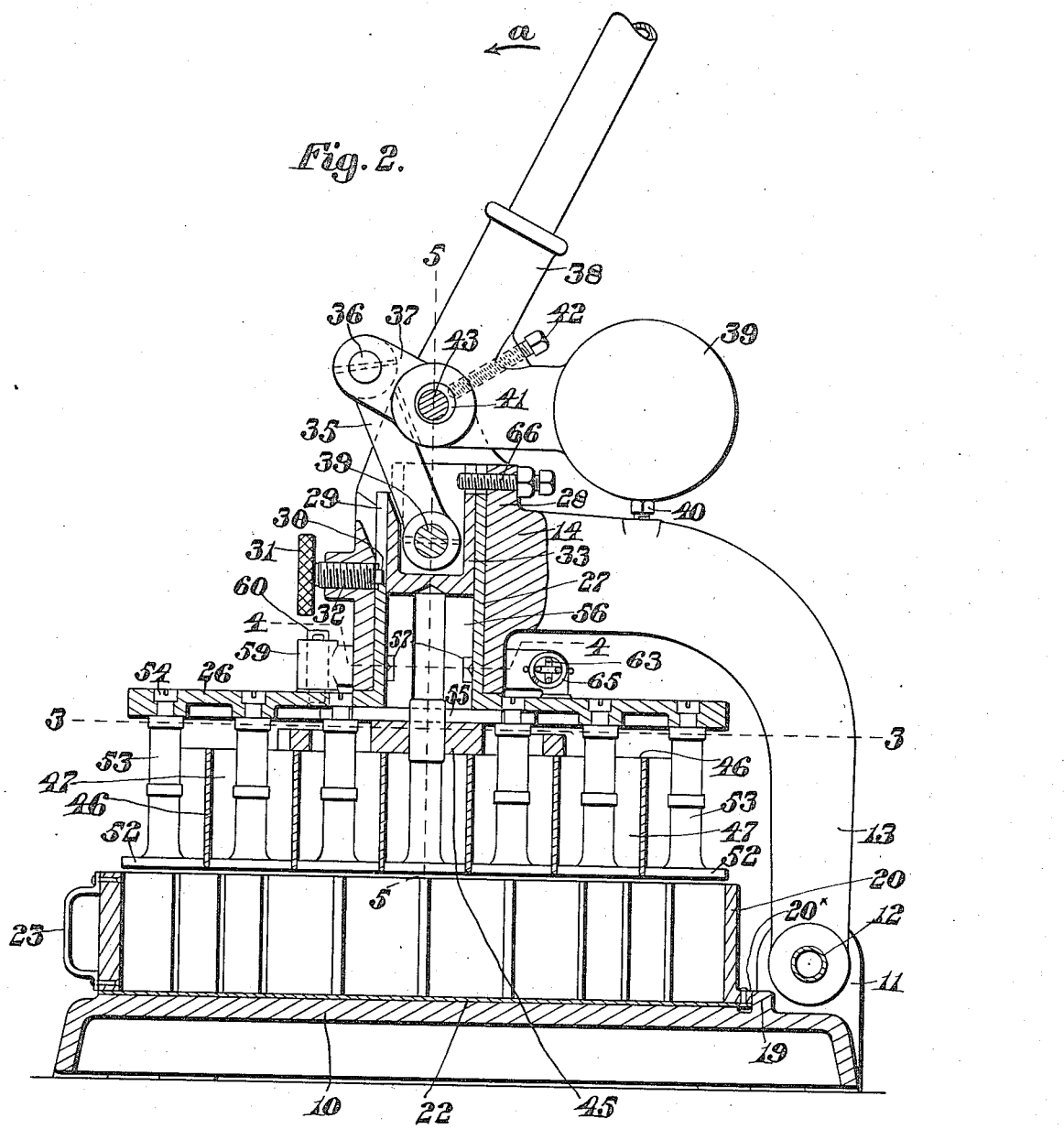

Of the drawings: Figure 1 represents a front elevation of a machine embodying the features of the present invention. Fig. 2 represents a vertical section of the same, the cutting plane being on line 2—2 on Fig. 1. Fig. 3 represents a horizontal section, the cutting plane being on line 3—3 on Fig. 2. Fig. 4 represents a horizontal section, the cutting plane being on line 4—4 on Fig. 2. Fig. 5 represents a partial vertical section, the cutting plane being on line 5—5 on Fig. 2, and Fig. 6 represents a section through one of the divided members.

Similar characters designate like parts throughout the several figures of the drawings.

In the drawings, 10 represents a bed plate from the rear of which project the upwardly extending ears 11—11, provided with a pivot member 12, on which is mounted the rearwardly extending arm 13 of a frame 14 carrying the dough compressing and dividing members. This frame 14 is provided with lateral downwardly extending arms 15 having cylindrical ends 16 normally positioned between the ears 17 forming a part of the bed plate 10, and to which the frame 14 is adapted to be locked by means of the locking pins 18 extending through said ears 17 and opening in the cylindrical ends 16. Extending upwardly from the rear of the bed plate 10 is a stop member 19 adapted to limit the inward movement of the pan 20. This stop member 19 and the side guide members 21 formed upon said bed plate 10 serve as a means for accurately positioning the pan 20 beneath the dough compressing and dividing devices carried by the pivoted frame 14. The pan 20 is preferably made with the side walls thereof scalloped, and having at the lower edge thereof a flange 21 to which is riveted a bottom plate 22 of thin sheet metal. The front exterior wall of the pan 20 is provided with a handle 23 preferably riveted thereto by which the pan may be readily manipulated. In suitable sockets formed in the side arms 15 of the pivoted frame 14 are secured vertical rods 24, the lower ends of which pass through and are positioned by ears 25 formed upon said side arms 15. These vertical rods 24 form guides for the vertically movable plate 26 through openings in which the said rods extend. This plate 26 is provided with a tubular extension 27 adapted to be reciprocated in a bearing formed in the hub 28 of the pivoted frame 14. This tubular extension 27 is provided with a vertical slot 29 with which the reduced end 30 of a clamp screw 31 coacts. This clamp screw 31 is threaded in a boss formed upon the hub 28 and is provided with an enlarged portion 32, the inner end of which is adapted to enter a shallow depression in the tubular hub 27 to prevent its reciprocation in its bearing when desired. Normally the clamping screw 31 is so positioned as to permit the free movement of the tubular extension 27 in its bearing. Mounted in the tubular extension 27 is a piston member 33 having a transverse pivot pin 34 extending through a link 35, the opposite end of which is connected by means of a pin 36 to the short arm 37 of an operating lever 38. This lever 38 is provided with a counterweight 39, which tends to return the operating lever to its normal backward position as shown in Fig. 2, when the lever 38 has been moved rearwardly beyond the vertical axis of the reciprocating piston 33. An adjustable stop 40 is mounted upon the rearwardly extending arm 13 of the pivoted frame 14 to limit the rearward movement of said operating lever 38. The operating lever is mounted upon an eccentric tubular member 41 and is secured thereto by means of the set screw 42. Through the eccentric member 41 extends a pivot pin 43 mounted in the upwardly extending ears 44 formed upon the pivoted frame 14. This eccentric tubular member 41 provides a means for limiting the downward movement of the piston 33 and the plate 45, formed thereon or secured thereto. To the under face of the plate 45 is secured the dividing member 46 having a plurality of cylindrical perforations 47 therein. The division walls between the various perforations 47 have their lower edges slightly beveled as indicated in Fig. 6 of the drawings, so that when this perforated plate is forced downwardly through a mass of dough contained within the pan 20, the upper skin of the dough will be forced downwardly and connected with the under skin, thereby causing all of the fractional parts divided from the mass of dough to be wholly enveloped with the skin so that no portion of raw dough will be exposed. Should the lower edges of the dividing member become worn, or should more pressure be desired, when the divisional walls reach a point of contact with the bottom plate 22 of the pan 20, the eccentric tubular member 41 may be turned slightly about the axis of the pivot pin 43, and by the set screw 42 secured in its new position. This forms an important feature of the present invention, as by it the downward movement of the perforated plate 46 may be accurately limited and any degree of final pressure secured.

The operating lever 38 is so constructed with a long operating handle and a short arm 37 that when the handle is moved in the direction of the arrow $a$ in Fig. 2, a quick movement is first imparted to the piston 33 and then when the dough compressing and dividing devices are in operation a slower movement is imparted thereto with a greatly increased leverage. This is of considerable advantage, as it makes the work of the operator much easier when the mass of dough is being compressed and then subsequently divided into fractional parts. The dough dividing member 46 is provided on its outer face with a plurality of semi-cylindrical recesses 48, which are the complement of similar semi-cylindrical recesses formed in the inner walls 49 of the pan 20. The partition walls 50 between the semi-cylindrical recesses 48 are provided with alined faces adapted to abut similar partition walls or ribs 51 extending inwardly from the side walls of the pan 20 between the semi-cylindrical recesses 49. By this construction when the perforated dividing member 46 has entered the pan 20 a plurality of complete cylindrical chambers are formed. In each of these cylindrical chambers or perforations 47 is mounted a plunger 52 having an elongated hub 53 secured to the plate 26 by means of the threaded members 54. All of these plungers 52 are secured to the plate 26 with the exception of the central plunger, which in lieu of the threaded member 54 has a transverse pin 55 extending therethrough, the end movement of which is prevented by means of the threaded member 54 at either end thereof. This pin 55 extends through a vertical slot 56 in the piston member 33, the slot 56 providing a means whereby the member 33 may be moved vertically independently of the tubular hub 27 forming a part of the plate 26. In semi-annular grooves formed in the wall of the member 33 are secured the members 57 provided with V-grooves, into each of which extends the beveled end of a pin 58 secured to a member pivoted at 60 to the plate 26. To the opposite end of each of said members 59 is threaded a hook 61 adapted to be adjusted therein and held in adjusted position by means of a check nut 62. On each of the hooks 61 is placed a bail 63, said bails extending in opposite directions and having their ends turned outwardly as indicated at 64. Surrounding the bails 63 between the out-turned ends 64 is a spring 65 adapted to move the members 59 about the pivots 60 to normally retain the beveled ends of the pins 58 in the V-grooves of the members 57. This provides a locking device between the vertically moving member 33 and the tubular hub 27 in which it is mounted, so that under normal conditions the two members will move in unison. When the operating lever 38 is moved in the direction of the arrow $a$, and both the member 33 and the tubular extension 27 are locked together, they will be moved downwardly until the short arm 37 contacts with the adjustable stop member 66 which limits the further downward movement. This would be the operation provided there is no dough in the pan 20, but when a mass of dough has been placed in this pan and the operating lever 38 is moved in the direction of the arrow $a$ the action of the members 33 and 27 will be simultaneous and the dividing member 46 and the plungers 52 contained therein will move together with their under faces in the same plane. This movement will continue until the dough has been compressed sufficiently, at which time further movement of the plungers will be prevented. The continued movement of the lever 38, however, will cause the piston member 33 with the dividing device 46 secured thereto to be moved downwardly, the beveled ends of the pins 58 being forced out of the V-grooves in the members 57 against the tension of the spring 65 to permit of this independent movement of the dividing member 46.

When the compressing and dividing of the dough into fractional parts has been completed, the return movement of the operating lever about its pivot pin 43 in the direction opposite to that of the arrow *a* on Fig. 2 of the drawings, will cause the plunger plate 26 and the dough dividing device 46 to be moved upwardly until the end of the slot 29 comes into contact with the reduced end 30 of the clamp screw 31, when further upward movement of the plunger plate 26 will be prevented and the piston member 33 of the dough dividing device 46 will continue its upward movement until the beveled ends of the pins 58 again engage the V-grooves in the members 57, when the apparatus will be in condition for another operation. This makes a very effective dough dividing machine which is simple in construction and may be easily and quickly operated.

When the handle has been thrown back until the counterweight 39 strikes the adjustable stop 40 the pan 20 may be removed and the fractional parts divided from the mass of dough may be placed in an ordinary baking pan, or they may be baked in the pan 20 and a new pan substituted therefor for the next operation. Preferably a plurality of pans are provided for each machine and as soon as the mass of dough is divided into the fractional parts the pan is immediately removed and placed in the oven. By the use of a machine of this kind all hand work upon the dough is dispensed with and the fractional parts are covered with a skin in the same manner as would have been secured after considerable manipulating in the hands of the baker.

Where it is desired to have a crust over the entire fractional part it is essential that the various parts shall be removed from the pan 20 and put into an ordinary baking pan and separated so that there will be no contact between the various fractional parts. Where the parts are left in the baking pan 20 and baked therein, during the process of rising the side walls of the fractional parts will come into contact so that in the baking only the upper and lower crust is formed but there remains a marked division between all of the fractional parts so that they are readily separated without handling when the baking has been accomplished. One of the main advantages of this process is that the various fractional parts are uniform in weight.

When it is desired to clean the apparatus, the clamping screw 31 is turned until the enlarged threaded portion 32 enters a recess in the wall of the tubular extension 27. This member thereupon will be locked to the pivoted frame 14 so that there can be no movement of the plunger plate 26 when the operating lever 38 is moved in the direction of the arrow *a*. When this lever is thus moved and the plunger plate has been locked the dough dividing device 46 will be moved alone beyond the plungers 52 so that the perforations 47 may be thoroughly cleansed. To facilitate this cleansing operation the frame 14 is pivoted at 12 and ordinarily locked by the pins 18. When, however, it is desired to clean the machine, these pins are removed and the whole pivoted frame with the plungers 52 and dough dividing member 46 carried thereby are moved rearwardly about the pivot 12 so that all the parts thereof are readily accessible.

It is believed that the operation and many advantages of the invention will be thoroughly understood without any further description.

Having thus described my invention, I claim:

1. In a device of the class described, the combination of a bed plate; a pan therefor; a perforated member fitting said pan; a plunger in each perforation thereof; an operating lever; means including a crank and pitman operable by said lever for forcing said plungers and perforated member into said pan to compress the dough therein and subsequently moving said perforated member through the dough to subdivide it; and an eccentric bearing for the pivot of said operating lever adapted to be adjusted to vary the movement of said perforated member.

2. A dough dividing machine having, in combination, a dough pan having substantially vertical side walls the inside faces of which are provided with a plurality of inwardly extending substantially vertical ribs and with partially-cylindrical substantially vertical recesses between the ribs so as to cause the inner faces of the side walls to have a scalloped appearance, said ribs having substantially flat inwardly facing end faces, a reciprocating dough dividing member arranged to fit within the pan and having its central portion provided with a plurality of substantially cylindrical chambers the partition walls of which constitute edges for dividing the dough and having its outer side faces provided with a plurality of outwardly extending substantially vertical partition walls and with partially-cylindrical substantially vertical recesses between said partition walls so as to cause the outer side faces of the dividing member to have a scalloped appearance, said partition walls having substantially flat outwardly facing end faces, means for moving the dough dividing member into the dough pan to divide the dough therein, the flat outer end faces of the partition walls on the dough dividing member fitting against the inwardly facing flat end faces of the ribs on the pan so as to cause the oppositely facing partially-cylindrical recesses of the dough dividing member and pan respectively to complement each other to form a plurality of substantially cylindrical chambers, and dough-pressing plungers mounted to reciprocate in the chambers formed in the central part of the dividing member and in the chambers formed by the complementing recesses of the dividing member and pan respectively.

3. A dough dividing machine having, in combination, a base, a frame having the substantial shape of an inverted U mounted on the base and having its oppositely-disposed downwardly-extending arms connected at their lower ends to the base, a dough pan positioned on the base between the arms, a dough dividing member mounted to reciprocate in the frame and to be moved downwardly into the pan to divide the dough therein, said dough dividing member provided with a plurality of downwardly opening chambers, a plunger plate having a plurality of dough-pressing plungers arranged to fit in the chambers, said plunger plate being yieldingly connected with the dough dividing member to be reciprocated thereby and cause the plungers to engage the dough in the pan, said downwardly-extending arms having on their inner sides and near their tops downwardly opening rod-receiving sockets, inwardly projecting ears on the arms located about midway of the length of the arms and extending beneath the edges of the plunger plate, and vertical guide rods having their upper ends secured in the sockets in the frame arms and having their lower ends secured in the ears, said plunger plate having rod-receiving openings in its edges so as to permit it to reciprocate on the vertical guide rods above the ears.

4. A dough dividing machine having, in combination, a dough pan, a frame over the dough pan, a dough dividing device for dividing the dough in the pan having a piston member mounted to reciprocate in a sliding bearing in the frame, a plunger plate above the dough dividing device having its central portion cut away to surround the piston member of the dough dividing device, a plurality of downwardly extending plungers secured to the underside of the plunger plate, said piston member having formed therein a downwardly opening vertical bore and having longitudinal slots cut through the piston member upon opposite sides of the bore, a central plunger similar to the other plungers having its upper end fitted to slide in the bore in the piston member and provided with a horizontal pin-receiving hole, and a horizontal pin extending through said hole and through the slots in the sides of the piston member and having its ends secured to the plunger plate, whereby the central plunger is moved by the plunger plate and guided by the bore in the piston member.

Signed by me at 4 Post Office Square, Boston, Mass., this 17th day of October, 1911.

ASHLEY F. WARD.

Witnesses:
 WALTER E. LOMBARD,
 NATHAN C. LOMBARD.